United States Patent
Madsen et al.

(10) Patent No.: US 11,040,512 B2
(45) Date of Patent: Jun. 22, 2021

(54) COMPOSITE STRUCTURES, FORMING APPARATUSES AND RELATED SYSTEMS AND METHODS

(71) Applicant: Northrop Grumman Systems Corporation, Falls Church, VA (US)

(72) Inventors: Christopher J. Madsen, Layton, UT (US); John B. Healey, South Weber, UT (US); Travis S. Olsen, Tremonton, UT (US); Ethan J. Hoffman, Ogden, UT (US); Jason H. Stulp, Kaysville, UT (US); Michael T. Tueller, Roy, UT (US); Wayne M. Roeber, Roy, UT (US); Vernon M. Benson, Clearfield, UT (US)

(73) Assignee: Northrop Grumman Systems Corporation, Plymouth, MN (US)

( * ) Notice: Subject to any disclaimer, the term of this patent is extended or adjusted under 35 U.S.C. 154(b) by 48 days.

(21) Appl. No.: 15/807,453

(22) Filed: Nov. 8, 2017

(65) Prior Publication Data

US 2019/0134937 A1 May 9, 2019

(51) Int. Cl.
*B32B 1/08* (2006.01)
*B32B 5/02* (2006.01)
(Continued)

(52) U.S. Cl.
CPC ............. *B32B 1/08* (2013.01); *B29C 70/32* (2013.01); *B29C 70/386* (2013.01); *B32B 5/022* (2013.01); *B32B 5/024* (2013.01); *B32B 5/26* (2013.01); *B32B 15/02* (2013.01); *B60R 19/03* (2013.01); *D03D 1/00* (2013.01); *D03D 13/004* (2013.01);
(Continued)

(58) Field of Classification Search
CPC ....... B29C 53/562; B29C 70/32; B29C 53/56; B29C 53/58; B29C 70/56; B32B 1/08
See application file for complete search history.

(56) References Cited

U.S. PATENT DOCUMENTS 1,853,157 A  4/1932 Spira
2,167,892 A  8/1939 Raymond et al.
(Continued)

FOREIGN PATENT DOCUMENTS

EP  83972 A2  7/1983
EP  83972 B1  11/1988
(Continued)

OTHER PUBLICATIONS

Machine Translation of WO-9420285-A1 (Year: 1994).*
(Continued)

*Primary Examiner* — Jacob J Cigna
*Assistant Examiner* — Michael W Hotchkiss
(74) *Attorney, Agent, or Firm* — TraskBritt

(57) ABSTRACT

Methods of forming a composite structure include conforming at least one ply of material to a forming surface of a tool having differing features. Apparatuses for forming a composite structure include a forming tool and a material feed assembly configured to hold a supply of material, where the material feed assembly may be configured to pivot the supply of material relative to the forming tool. Composite structures having an at least partially annular shape are formed by an at least partially automated process.

18 Claims, 6 Drawing Sheets

(51) Int. Cl.
*B32B 5/26* (2006.01)
*D03D 13/00* (2006.01)
*D03D 1/00* (2006.01)
*B32B 15/02* (2006.01)
*B29C 70/32* (2006.01)
*B29C 70/38* (2006.01)
*B29C 70/56* (2006.01)
*B60R 19/03* (2006.01)

(52) U.S. Cl.
CPC ......... *B29C 70/56* (2013.01); *B32B 2262/101* (2013.01); *B32B 2262/103* (2013.01); *B32B 2262/105* (2013.01); *B32B 2307/54* (2013.01); *B32B 2605/18* (2013.01); *D10B 2505/02* (2013.01)

(56) References Cited

U.S. PATENT DOCUMENTS

| | | | |
|---|---|---|---|
| 2,282,655 A | 5/1942 | Huck | |
| 2,440,862 A | 5/1948 | Le Jeune | |
| 2,441,135 A | 5/1948 | Chalupa | |
| 2,594,693 A * | 4/1952 | Smith | C04B 26/02 220/62.19 |
| 2,773,297 A | 12/1956 | Cotchett | |
| 2,874,546 A | 2/1959 | Fox | |
| 3,027,911 A | 4/1962 | Gilmore | |
| 3,099,917 A | 8/1963 | Spiri | |
| 3,245,280 A | 4/1966 | Mooney | |
| 3,268,380 A * | 8/1966 | Guichon | B29D 30/60 156/130 |
| 3,336,842 A | 8/1967 | Adelt | |
| 3,420,721 A * | 1/1969 | Bayless | B65H 81/08 156/162 |
| 3,578,831 A | 5/1971 | Scheifele | |
| 3,692,374 A | 9/1972 | Scheifele | |
| 3,716,442 A * | 2/1973 | Hineline | B29D 30/3028 156/397 |
| 3,788,015 A | 1/1974 | Musser | |
| 3,923,422 A | 12/1975 | Lanniello | |
| 3,952,547 A | 4/1976 | Klein et al. | |
| 4,051,289 A | 9/1977 | Adamson | |
| 4,099,311 A | 7/1978 | Uwe | |
| 4,172,175 A * | 10/1979 | Pearson | B29C 53/805 156/175 |
| 4,252,349 A | 2/1981 | Mahoff | |
| 4,289,168 A * | 9/1981 | Lecourt | F16L 47/265 138/109 |
| 4,319,944 A * | 3/1982 | Pope | B29C 53/566 156/195 |
| 4,331,246 A | 5/1982 | Sorensen | |
| 4,529,139 A * | 7/1985 | Smith | B29C 53/584 242/437.3 |
| 4,596,619 A * | 6/1986 | Marks | B29C 53/581 102/285 |
| 4,650,166 A | 3/1987 | Warmuth | |
| 4,834,616 A | 5/1989 | Kasarsky | |
| 4,906,306 A | 3/1990 | Masatada et al. | |
| 4,909,880 A * | 3/1990 | Kittelson | B29C 53/581 156/185 |
| 5,067,665 A | 11/1991 | LoStracco et al. | |
| 5,094,200 A | 3/1992 | Fontichiaro | |
| 5,150,897 A | 9/1992 | Wortman | |
| 5,248,169 A | 9/1993 | Barbe et al. | |
| 5,288,114 A | 2/1994 | Crane et al. | |
| 5,349,738 A | 9/1994 | Crane | |
| 5,484,498 A * | 1/1996 | Hogarth | B29C 70/345 156/189 |
| 5,496,073 A | 3/1996 | Grenier | |
| 5,538,769 A * | 7/1996 | Sandman, Jr. | A01K 87/00 428/36.3 |
| 5,738,749 A | 4/1998 | Grimshaw et al. | |
| 5,875,915 A | 3/1999 | Bradshaw et al. | |
| 5,989,384 A | 11/1999 | Grimshaw et al. | |
| 6,026,883 A * | 2/2000 | Hegerhorst | B29C 70/384 156/361 |
| 6,096,164 A * | 8/2000 | Benson | B29C 53/602 156/425 |
| 6,138,861 A * | 10/2000 | Palazzo | B29C 48/07 220/586 |
| 6,290,799 B1 * | 9/2001 | Deckers | B29C 53/82 156/166 |
| 6,290,895 B1 | 9/2001 | Wang et al. | |
| 6,430,264 B1 | 8/2002 | Lee | |
| 6,684,485 B1 | 2/2004 | Potocnik et al. | |
| 6,989,067 B2 * | 1/2006 | Armstrong, Jr. | B65H 81/04 156/117 |
| 7,077,091 B2 | 7/2006 | Nix et al. | |
| 7,118,069 B2 | 10/2006 | Novak et al. | |
| 7,124,831 B2 | 10/2006 | Turley et al. | |
| 7,195,417 B2 | 3/2007 | Shiao et al. | |
| 7,467,799 B1 | 12/2008 | Tarlton | |
| 7,510,616 B2 * | 3/2009 | Hayashi | B29D 30/30 156/117 |
| 7,712,886 B2 | 5/2010 | Silverbrook et al. | |
| 7,931,403 B2 | 4/2011 | Fish et al. | |
| 8,365,502 B2 | 2/2013 | Allen et al. | |
| 8,448,837 B2 | 5/2013 | Dambrine et al. | |
| 8,647,011 B2 | 2/2014 | Schreiber | |
| 8,667,754 B2 | 3/2014 | Schalla et al. | |
| 8,679,275 B2 | 3/2014 | Schalla et al. | |
| 8,713,895 B2 | 5/2014 | Allen et al. | |
| 9,017,814 B2 * | 4/2015 | Xie | B29C 70/222 428/116 |
| 9,266,279 B2 * | 2/2016 | Benson | B29C 70/06 |
| 9,279,399 B2 | 3/2016 | Fabros | |
| 9,403,325 B2 * | 8/2016 | Corradini | B65H 23/0328 |
| 9,458,672 B2 | 10/2016 | Jewett | |
| 9,518,356 B2 * | 12/2016 | Sundermann | D06M 15/70 |
| 9,840,936 B2 * | 12/2017 | Lussier | F01D 21/045 |
| 10,525,640 B2 * | 1/2020 | Benson | B29C 70/388 |
| 10,525,641 B2 * | 1/2020 | Benson | B29C 70/504 |
| 2002/0115385 A1 | 8/2002 | Misra et al. | |
| 2004/0200123 A1 | 10/2004 | Whiting | |
| 2005/0023728 A1 * | 2/2005 | Benson | B29C 70/388 264/258 |
| 2005/0157136 A1 | 7/2005 | Silverbrook et al. | |
| 2005/0189104 A1 | 9/2005 | Turley et al. | |
| 2006/0019759 A1 | 1/2006 | Shiao et al. | |
| 2006/0065220 A1 | 3/2006 | Hix et al. | |
| 2006/0185218 A1 | 8/2006 | Whiting | |
| 2006/0225685 A1 | 10/2006 | Hix et al. | |
| 2006/0258469 A1 | 11/2006 | Dewhirst et al. | |
| 2007/0039160 A1 | 2/2007 | Turley et al. | |
| 2008/0160122 A1 * | 7/2008 | Blanton | B29C 53/585 425/90 |
| 2008/0173172 A1 | 7/2008 | Fish et al. | |
| 2009/0101328 A1 * | 4/2009 | Leslie | E21B 17/003 166/65.1 |
| 2009/0294566 A1 * | 12/2009 | Witmer | B29C 53/66 242/410 |
| 2010/0054856 A1 | 3/2010 | Schalla et al. | |
| 2010/0055383 A1 | 3/2010 | Schalla et al. | |
| 2010/0218879 A1 | 9/2010 | Turley et al. | |
| 2011/0038666 A1 | 2/2011 | Schreiber | |
| 2011/0140299 A1 | 6/2011 | Huang et al. | |
| 2011/0227295 A1 | 9/2011 | Watanabe et al. | |
| 2012/0098154 A1 | 4/2012 | Huang et al. | |
| 2012/0100291 A1 | 4/2012 | Huang et al. | |
| 2012/0175047 A1 | 7/2012 | Dambrine et al. | |
| 2012/0219408 A1 * | 8/2012 | Harada | B29C 53/562 415/182.1 |
| 2012/0222802 A1 * | 9/2012 | Niefnecker | B29C 70/386 156/189 |
| 2013/0186040 A1 | 7/2013 | Allen et al. | |
| 2014/0110063 A1 * | 4/2014 | Mathon | B29C 53/562 156/446 |
| 2014/0230782 A1 | 8/2014 | Fabros | |
| 2014/0251639 A1 | 9/2014 | Jewett | |
| 2014/0301802 A1 | 10/2014 | Kozak | |
| 2015/0267541 A1 | 9/2015 | Hui et al. | |

(56) References Cited

U.S. PATENT DOCUMENTS

| | | | |
|---|---|---|---|
| 2016/0033063 | A1 | 2/2016 | Leslie et al. |
| 2016/0165767 | A1 | 6/2016 | Tsai et al. |
| 2016/0237831 | A1 | 8/2016 | Strock |
| 2017/0190446 | A1 | 7/2017 | Williams, Sr. |
| 2017/0198734 | A1 | 7/2017 | Bernard et al. |
| 2019/0118496 | A1* | 4/2019 | Slack .................. B29C 70/20 |
| 2020/0180208 | A1* | 6/2020 | Mailly ................ B29C 70/56 |

FOREIGN PATENT DOCUMENTS

| | | | |
|---|---|---|---|
| EP | 486202 A2 | 5/1992 | |
| EP | 272431 B1 | 1/1993 | |
| EP | 644040 A1 | 3/1995 | |
| EP | 499561 B1 | 5/1995 | |
| EP | 655577 A2 | 5/1995 | |
| EP | 486202 B1 | 12/1995 | |
| EP | 1092529 A1 | 4/2001 | |
| EP | 1092529 B1 | 4/2004 | |
| EP | 2497626 A1 | 9/2012 | |
| EP | 3056676 A1 | 8/2016 | |
| EP | 2324258 A | 11/2016 | |
| EP | 3193029 A1 | 7/2017 | |
| FR | 1103787 A | 11/1955 | |
| GB | 479114 A | 1/1938 | |
| GB | 503757 A | 4/1939 | |
| GB | 590799 A | 7/1947 | |
| GB | 837591 A | 6/1960 | |
| GB | 1037911 A | 8/1966 | |
| GB | 1037913 A | 8/1966 | |
| GB | 1037915 A | 8/1966 | |
| GB | 1037918 A | 8/1966 | |
| GB | 1059682 A | 2/1967 | |
| GB | 1249810 A | 10/1971 | |
| GB | 1375187 A | 11/1974 | |
| GB | 1445486 A | 8/1976 | |
| GB | 2163515 A | 2/1986 | |
| GB | 2163515 B | 9/1987 | |
| GB | 2191249 A | 12/1987 | |
| GB | 2191249 B | 5/1990 | |
| GB | 2424464 A | 9/2006 | |
| JP | 2000153567 A | 6/2000 | |
| JP | 4942388 B2 | 5/2012 | |
| JP | 2013036466 A | 2/2013 | |
| JP | 5166672 B2 | 3/2013 | |
| JP | 2014105414 A | 6/2014 | |
| JP | 5598528 B2 | 10/2014 | |
| JP | 5808111 B2 | 11/2015 | |
| JP | 5875147 B2 | 3/2016 | |
| JP | 5934067 B2 | 6/2016 | |
| WO | WO-9420285 A1 * | 9/1994 | ............ B29C 53/56 |
| WO | 0111273 A1 | 2/2001 | |
| WO | 2005054694 A1 | 6/2005 | |
| WO | 2005070681 A1 | 8/2005 | |
| WO | 2008101158 A2 | 8/2008 | |
| WO | WO-2008093967 A1 * | 8/2008 | ............ F16L 55/17 |
| WO | 2009025226 A1 | 2/2009 | |
| WO | 2010024990 A1 | 3/2010 | |
| WO | 2010024994 A1 | 3/2010 | |
| WO | 2010061806 A1 | 6/2010 | |
| WO | 2011099275 A1 | 8/2011 | |
| WO | 2012002355 A1 | 1/2012 | |
| WO | 2012073775 A1 | 6/2012 | |
| WO | 2012105415 A1 | 8/2012 | |
| WO | 2013029475 A1 | 3/2013 | |
| WO | 2014083975 A1 | 6/2014 | |
| WO | 2017064646 A1 | 4/2017 | |
| WO | WO-2018208298 A1 * | 11/2018 | ............ B29C 70/56 |

OTHER PUBLICATIONS

International Written Opinion for International Application No. PCT/US18/59611, dated Feb. 18, 2019, 09 pages.

International Search Report for International Application No. PCT/US18/59611, dated Feb. 18, 2019, 06 pages.

* cited by examiner

COMPOSITE STRUCTURES, FORMING APPARATUSES AND RELATED SYSTEMS AND METHODS

TECHNICAL FIELD

Embodiments of the present disclosure relate to composite structures and related devices, apparatuses, systems, and methods that have a geometry that varies along at least one dimension of the structure. Embodiments of the present disclosure also relate to forming apparatuses and devices for such composite structures that include a forming tool and at least one material feed assembly that is movable (e.g., pivotable) relative to the forming tool and related apparatuses and methods.

BACKGROUND

Fiber-reinforced composite materials provide relatively light weight and high strength structures that are implemented in a variety of industries, including aerospace applications. However, composites structures made from the fiber-reinforced composite materials and having certain shapes are difficult to fabricate with desired strength characteristics. For example, annular-shaped composite structures are conventionally made by hand lay-up using intermediate debulkings. Further, complex curved structures with varied surface features provide similar difficulties. As a consequence, fabricating such structures requires costly processes that take a significant amount of time to complete and with often less than desired results.

During the formation of such parts, the laying up plies of material may lead to the formation of defects such as wrinkles or waves, which weaken the parts. Further, certain shapes may not be achieved with the desired strength and weight characteristic due to limitations of manipulating and/or stretching plies of fiber-reinforced material. Workarounds, such as darting or otherwise cutting the plies can be used to lessen the formation of wrinkles and allow for the plies to be conformed to the desired shape of a part, but this type of darting and/or cutting generally degrades the performance or adversely effects the structural characteristics of the part.

SUMMARY OF DISCLOSURE

This summary is provided to introduce a selection of example embodiments in a simplified form. These example embodiments are described in further detail in the detailed description below. This summary is not intended to identify key features or essential features of the claimed subject matter, nor is it intended to be used to limit the scope of the claimed subject matter.

Some embodiments of the present disclosure include a method of forming a composite structure having an at least partially annular shape in an at least partially automated process. The method includes applying at least one ply of material on a forming surface of a tool configured to form the composite structure having the at least partially annular shape, wherein fibers in at least one ply of material are offset relative to a side of the at least one ply of material and conforming the at least one ply of material to the forming surface of the tool. The conforming comprises conforming a first portion of the at least one ply of material to a first radius of curvature to the forming surface of the tool, conforming a middle portion of the at least one ply of material extending between the first portion and a second portion of the at least one ply of material to the forming surface of the tool, and conforming the second portion of the at least one ply of material to a second radius of curvature to the forming surface of the tool, wherein the second radius of curvature is either greater than or lesser than the first radius of curvature. The method further comprises curing the at least one ply of material to form the composite structure.

Some embodiments of the present disclosure include a method of forming a composite structure having an at least partially annular shape in an at least partially automated process. The method includes conforming a first portion of at least one ply of material to a first diameter to a forming surface of a tool, conforming a second portion of the at least one ply of material to a second diameter to the forming surface of the tool, wherein the second diameter is either greater than or lesser than the first diameter, and extending a middle portion of the at least one ply of material extending between the first portion and the second portion of the at least one ply of material along a portion of the forming surface that gradually changes from the first diameter to the second diameter.

Some embodiments of the present disclosure include an apparatus for forming a composite structure comprising a forming tool having a forming surface configured to receive at least one ply of material to form the composite structure, a forming mechanism configured to apply a force to at least a portion of the at least one ply of material to conform the at least a portion of the at least one ply of material to the forming surface of the forming tool, and a material feed assembly configured to hold a supply of the at least one ply of material and to provide the at least one ply of material onto the forming tool. The material feed assembly is configured to pivot the supply of the at least one ply of material relative to the forming tool.

Some embodiments of the present disclosure include an apparatus for forming a composite structure comprising a forming tool having a forming surface configured to receive at least one ply of material to form the composite structure. The forming tool comprises a first portion having a cross section exhibiting a first radius of curvature, a second portion having a cross section exhibiting a second radius of curvature, wherein the second radius of curvature is either greater than or lesser than the first radius of curvature, and a middle portion extending between the first portion and the second portion, wherein a cross section of the middle portion gradually changes from the first radius of curvature to the second radius of curvature. The apparatus further comprising a forming mechanism configured to apply a force to at least a portion of the at least one ply of material to conform the at least a portion of the at least one ply of material to the forming surface of the forming tool and a material feed assembly configured to hold a supply of the at least one ply of material and to provide the at least one ply of material onto the forming tool.

Some embodiments of the present disclosure include an apparatus for forming a composite structure comprising an annular forming tool having a curved forming surface configured to receive at least one ply of material to form the composite structure and a material feed assembly configured to hold a supply of the at least one ply of material and to provide the at least one ply of material onto the forming tool. The material feed assembly configured to apply a force (e.g., tension) to the at least one ply of material as the at least one ply of material is dispensed to the forming tool.

Some embodiments of the present disclosure include a composite structure having an at least partially annular shape. The structure comprising ply layers exhibiting the at least partially annular shape, where fibers in at least one ply of material of the ply layers are offset relative to a side of the at least one ply of material. The at least one ply of material having a varying cross section comprising a first portion having a cross section exhibiting a first radius of curvature, a second portion having a cross section exhibiting a second radius of curvature, where the second radius of curvature is either greater than or lesser than the first radius of curvature, and a middle portion extending between the first portion and the second portion. A cross section of the middle portion gradually changes from the first radius of curvature to the second radius of curvature and spacing between adjacent fibers in at least one ply of material varies along the varying cross section of the at least one ply of material. A portion of the at least one ply of material extending between the adjacent fibers at the varying spacing is continuous.

BRIEF DESCRIPTION OF THE DRAWINGS

The present disclosure may be understood more fully by reference to the following detailed description of example embodiments, which are illustrated in the appended figures.

DETAILED DESCRIPTION

Figure 1:
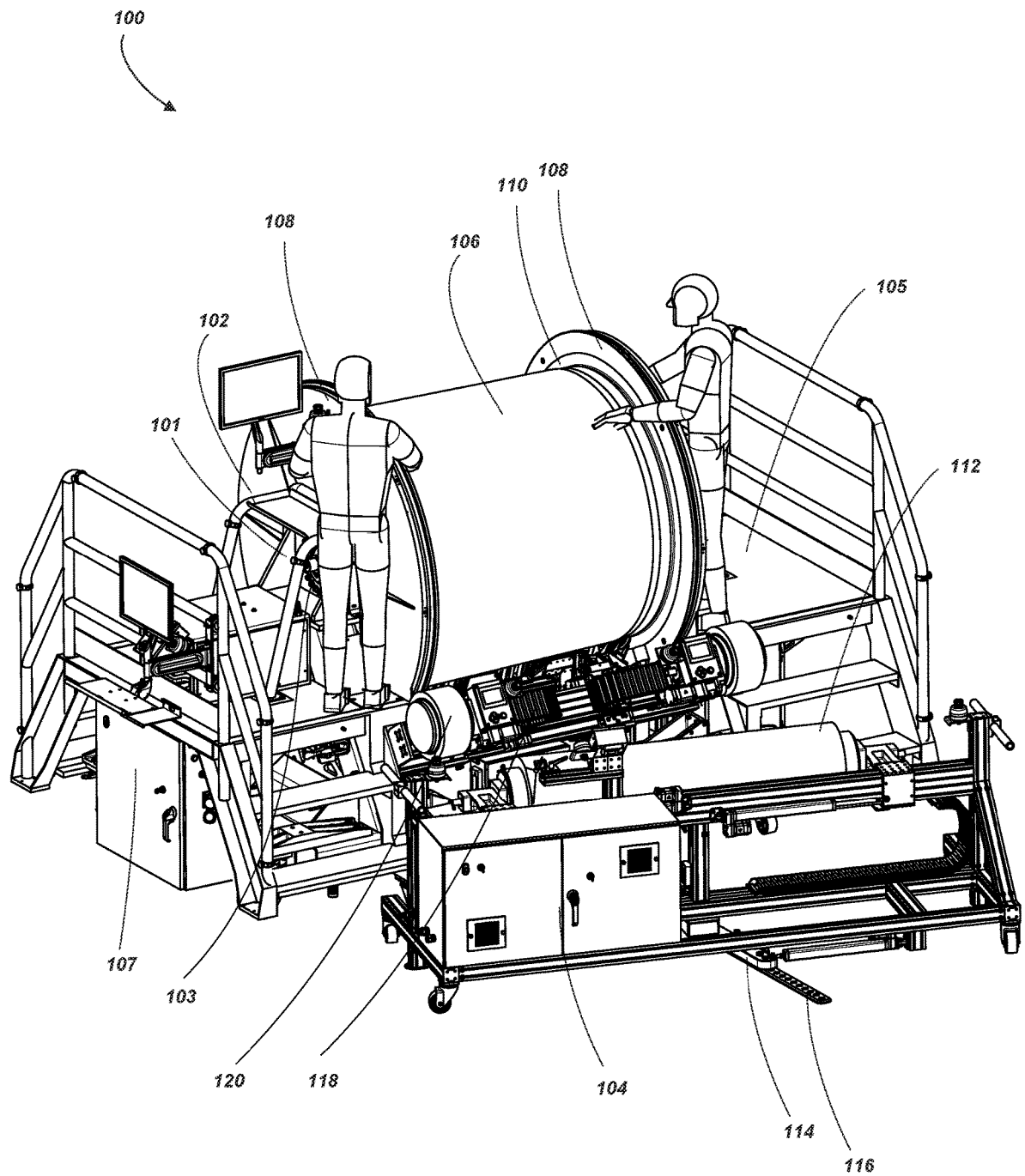
FIG. 1 is a perspective view of a composite part forming system according to an embodiment of the present disclosure.

In some instances, the illustrations presented herein are not meant to be actual views of any particular device, apparatus, system, assembly, method, or component thereof, but are merely simplified schematic representations employed to describe illustrative embodiments of the disclosure. The drawings are not necessarily to scale.

As used herein, any relational term, such as "first," "second," "over," "beneath," "top," "bottom," "underlying," "up," "down," etc., is used for clarity and convenience in understanding the disclosure and accompanying drawings, and does not connote or depend on any specific preference, orientation, or order, except where the context clearly indicates otherwise. In some instances, these terms may refer to an orientation of elements as illustrated in the figures.

As used herein, the terms "vertical" and "horizontal" may refer to a drawing figure as oriented on the drawing sheet, and are in no way limiting of orientation of a feature, or any portion thereof, unless it is apparent that a particular orientation of the feature is necessary or desirable for operation in view of gravitational forces.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

Embodiments of the present disclosure may provide structures and related devices, apparatuses, systems, and methods, that have, for example, a geometry (e.g., an at least partially annular shape) that varies along at least one dimension of the structure. For example, such structures may include an at least partially annular shape, such as, for example, a portion having a cross section exhibiting an arc, a curve, a full oval, a spheroid (e.g., prolate spheroid), a full circle, or combinations thereof, where a feature of the cross section (e.g., radius, diameter, curvature, radius of curvature, length of an arc, etc.) varies along a dimension of the structure (e.g., a width and/or length). In some embodiments, the structure may have a substantially annular shape (e.g., a cylindrical shape, an irregular cylindrical shape) where the diameter of the structure varies along the length (e.g., from a first open end to a second open end of the structure). In other embodiments, the structure may have other cross-sectional shapes and one or more open and/or closed ends.

In some embodiments, only a portion of the structure may include such a variation. In some embodiments, the structure may vary along the entire length. In some embodiments, the variation in the structure may exhibit a gradual increase or decrease in a dimension in order to define a tapered portion and/or ogive portion.

In some embodiments, such structures may comprise structures for aerospace applications, such as, for example, aircraft engines, fan containment cases, aft fan cases, bypass ducts, nacelle doors, and/or other structures (e.g., elongated structures having discontinuous portions, such as bump outs, bump ins, lofted portions, recesses portions, etc.).

In some embodiments, the variation of the structure from a first dimension (e.g., diameter) to a second dimension (e.g., diameter) may comprise at least one percent change in the value of a given dimension (e.g., at least 5%, 6%, 8%, 10%, 15%, 20%, 25%, 30% or greater).

Embodiments of the present disclosure may provide methods, systems, assemblies, and apparatus related to forming a composite structure, for example, having an at least partially annular shape and such resultant structures. Such apparatuses, systems, and methods may include positioning a material feed assembly at a selected angle (e.g., an oblique angle) relative to an at least partially annular tool for forming the composite structure. In such an apparatus and/or system, respective axes (e.g., longitudinal axes, centerlines) of at least a portion of the material feed assembly and the annular tool may be movable (e.g., rotatable and, optionally, translatable) relative to each other. For example, the material feed assembly may pivot relative to the annular tool in order to define an angle between an axis extending along a lateral direction of material being fed onto the tool (e.g., a centerline of a spool and/or a lateral axis of a sheet of material being applied to the tool) and an axis of the tool (e.g., a centerline or central axis of the tool).

In some embodiments, the material feed assembly may be positionable to multiple sides (e.g., a first side and a second opposing side of the tool) where both positions of the assembly enable pivoting relative to the tool. In some embodiments, the material feed assembly may include multiple (e.g., two or more) material feed units positioned about the tool (e.g., on opposing sides of the tool).

It is noted that while embodiments of the disclosure discussed herein in detail may pertain to the forming of at least partially annular structures, the apparatus and methods disclosed herein may be utilized to form structures with other geometries. For example, the apparatus and methods disclosed herein may be utilized to form elongate structures having varying dimensions, such as a varying lateral shape and/or cross section.

Materials used to form the composite structure are generally described as plies of material or ply layers, which may be laid up on a tool one at a time and/or multiple layers at the same time. The plies or layers can be made of any materials with fibers (or plies) that exhibit desired characteristics including, but not limited to, pre-preg material and/or dry fiber material. The pre-preg material and the dry fiber material can include, but are not limited to, unidirectional tapes, bias tapes, woven fabrics, non-woven fabrics, and non-crimp fabrics. The orientation of the fibers (or plies) may also vary throughout the structure.

In some embodiments, the materials used to form the composite structure may comprise polymer or elastomers matrix composites, metal matrix composites, ceramic matrix composites, combinations thereof, or any other suitable materials. In some embodiments, reinforcing materials or fibers in the materials may include glass, carbon, aramid, ceramics, nitrides (e.g., boron nitride), carbides (e.g., silicon carbide), combinations thereof, or any other suitable materials.

In some embodiments, the material may be pre-stretched and/or preformed prior to be applied to a tool, for example, according to the methods and devices disclosed in U.S. Pat. No. 9,266,279, issued Feb. 23, 2016, the disclosure of which is hereby incorporated herein in its entirety by this reference.

FIG. 1 is a perspective view of a composite part forming system 100 including a frame or gantry (e.g., frame 101), a forming tool 102 (e.g., exhibiting an at least partially annular shape) coupled to the frame 101, and a material feed assembly 104. As shown in FIG. 1, the forming tool 102 may be movably coupled to the frame 101 (e.g., rotatably coupled, translatably coupled, or combinations thereof). The frame 101 may include one or more control features (e.g., motor 103) for moving the forming tool 102 relative to the frame 101. In some embodiments, the frame 101 may include other features such as platforms 105 for users of the system 100 and/or control systems 107 for operating and/or monitoring one or more portions of the composite part forming system 100.

A composite structure or part 106, or portion thereof, may be formed on the forming tool 102 and may exhibit an at least partially annular shape, such as, for example, at least a portion of an annular structure (e.g., a full annular structure with one or more radially extending or upturned flanges on either end of the structure 106).

As noted above, the forming tool 102 and/or the resultant structure 106 formed over the geometry of the tool 102 may have an at least partially annular shape that varies along at least one dimension of the tool 102 and the structure 106. For example, such tools 102 and structures 106 may include an at least partially annular shape, such as, for example, a portion having a cross section exhibiting an arc, a curve, a full oval, a full circle, or combinations thereof where a feature of the cross section (e.g., radius, diameter, curvature, radius of curvature, length of an arc, etc.) varies along a dimension of the structure 106 (e.g., a width and/or length). In some embodiments, the structure 106 may have a substantially annular shape (e.g., a cylindrical shape) where the diameter and radius of curvature of the structure 106 varies along the length (e.g., from a first open end to a second open end of the structure 106). In some embodiments, only a portion of the structure 106 may include such a variation. In some embodiments, the structure 106 may vary along the entire length. In some embodiments, the variation in the structure 106 may exhibit a gradual increase or decrease in a dimension in order to define a tapered portion. In some embodiments, a first portion or section of the structure 106 may include such a variation and one or more portions may exhibit similar and/or dissimilar variations.

In some embodiments, the forming tool 102 may include one or more radially extending flange portions 108. For example, the forming tool 102 may include two radially extending flange portions 108 positioned at opposing sides (e.g., ends) of the forming tool 102. The structure 106 may include corresponding flange portions 110, for example, that include one or more continuous plies that extend from the at least partially annual shape of the middle of the structure 106 onto (e.g., to a radial extent of) the flange portions 110. The one or more flange portions 108 may extend in a direction transverse to a central axis of the forming tool 102 (e.g., in a substantially perpendicular direction or offset from a substantially perpendicular direction).

The material feed assembly 104 may include a supply of material 112 (e.g., roll of material) movably (e.g., rotatably and/or translatably) coupled to the material feed assembly 104. The material feed assembly 104 and/or the forming tool 102 may be utilized to apply a force (e.g., a tension) to one or more plies of material as the ply or plies are passed from the supply of material 112 to the forming tool 102 (e.g., as the ply or plies travel from the supply of material 112 to the forming tool 102). For example, a tension may be applied to the ply or plies in between the material feed assembly 104 and the forming tool 102.

The composite part forming system 100 may enable the material feed assembly 104 to be oriented at a selected angle (e.g., an offset and/or oblique angle) relative to forming tool 102 for forming the composite structure 106. For example, respective axes (e.g., longitudinal axes, centerlines) of the material feed assembly 104 and/or the supply of material 112 and the forming tool 102 may be movable (e.g., rotatable and, optionally, translatable) relative to each other. In some embodiments, the material feed assembly 104 may pivot relative to the forming tool 102 (e.g., with a pivot mechanism 114) in order to define an angle between an axis extending along a lateral direction of material 112 being fed onto the tool (e.g., along a centerline of a spool of material 112 and/or a lateral axis of a sheet of the material 112 being applied to the tool 102) and an axis of the tool 102 (e.g., a centerline or central axis of the tool 102).

In some embodiments, the pivot mechanism 114 of the material feed assembly 104 enables the material feed assembly 104 relative to the forming tool 102. For example, the pivot mechanism 114 may anchor the material feed assembly 104 into an adjoining structure (e.g., a floor) while enabling the material feed assembly 104 to rotated about a portion of the pivot mechanism 114 that may be coupled with one or more anchor points 116, as discussed below in greater detail.

In some embodiments, the material feed assembly 104 may be positionable to multiple sides (e.g., a first side and a second opposing side of the forming tool 102) where both positions of the assembly 104 enable pivoting relative to the tool 102. For example, the system 100 may include two or more anchor points 116 (e.g., coupled to a floor on either side of the forming tool 102). The pivot mechanism 114 and the material feed assembly 104 may be moved about the forming tool 102 and selectively coupled to the anchor points 116 (e.g., which may include a track of multiple points for varying the distance of the material feed assembly 104 relative to the tool 102) in order to apply material on various sides of the tool 102 (e.g., opposing sides). Such positioning material feed assembly 104 may enable the material 112 (e.g., fibers of the material 112) to be applied to the tool 102 a desired orientation relative to varying features of the forming tool 102.

In some embodiments, the system 100 may include one or more features positioned between the material feed assembly 104 and the forming tool 102 that assists in the feeding of the material (e.g., an intermediate redirect spool, spread roller, etc.).

In some embodiments, the material feed assembly 104 may include multiple (e.g., two or more) material feed assemblies 104 positioned about the tool 102 (e.g., on opposing sides of the tool 102).

The system 100 may include a forming mechanism 118. As discussed below in greater detail, the forming mechanism 118 may be positioned adjacent to forming tool 102 (e.g., underneath) and may act to manipulate (e.g., force) the material 112 prior to, during, and/or after the material 112 is placed over the forming tool 102. In some embodiments, the forming mechanism 118 may include one or more rotating members 120 that may be used to apply and/or form one or more sheets of material 112 (e.g., a sheet of material 112 having a lateral width that is less than a dimension of the forming tool 102, for example, a dimension extending along an axis of the forming tool 102). For example, the rotating members 120 may be utilized to apply strips of material 112 onto portions of the forming tool 102 proximate the flange portions 108 (e.g., on or adjacent the flange portions 108).

Figure 2:
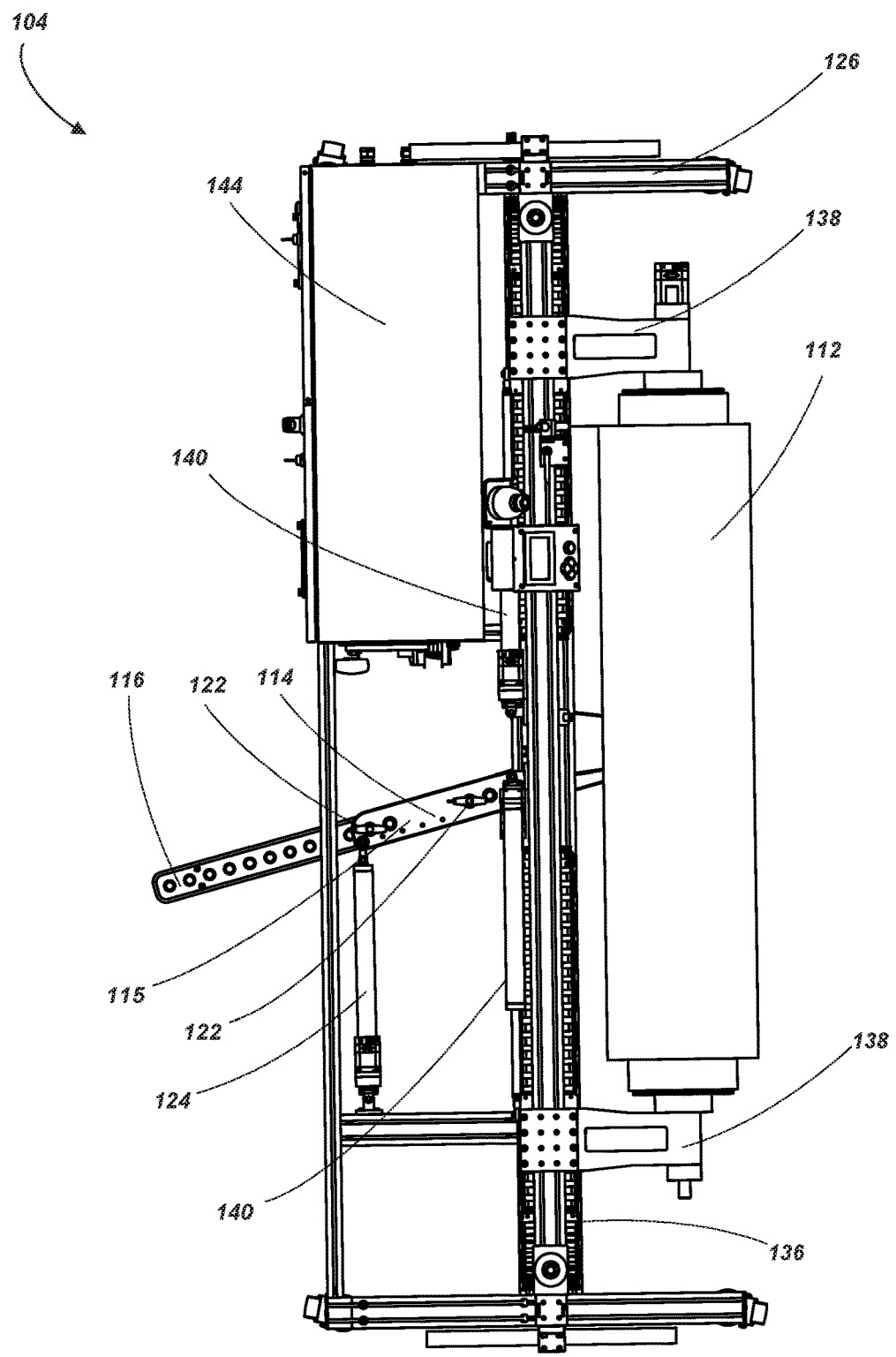
FIG. 2 is a plan view of a material feed assembly according to an embodiment of the present disclosure.

FIG. 2 is a plan view of a material feed assembly (e.g., the material feed assembly 104 of the system 100 shown in FIG. 1). As shown in FIG. 2, the material feed assembly 104 includes the supply of material 112. The material feed assembly 104 may pivot relative to the forming tool 102 (FIG. 1) with the pivot mechanism 114 in order to define an angle between an axis extending along a lateral direction of material 112 being fed onto the tool (e.g., a centerline of a spool of material 112 and/or a lateral axis of a sheet of the material 112 being applied to the tool 102 (FIG. 1)) and an axis of the tool 102 (e.g., a centerline or central axis of the tool 102).

The pivot mechanism 114 of the material feed assembly 104 may enable the material feed assembly 104 to move (e.g., translate and/or rotate) an adjoining structure (e.g., the forming tool 102 (FIG. 1)). For example, the pivot mechanism 114 may anchor the material feed assembly 104 to an adjoining structure (e.g., a floor) while enabling the material feed assembly 104 to rotated about a portion of the pivot mechanism 114 that may be coupled with one or more anchor points 116 (e.g., which are secured to the floor). For example, the pivot mechanism 114 may include one or more pins 122 that engage with the anchor points 116 in order to selectively secure a portion of the pivot mechanism 114 (e.g., a pivot plate 115) to the anchor points 116. As depicted, the anchor points 116 may include a track of multiple points for varying the distance of the material feed assembly 104 relative to another structure.

The material feed assembly 104 may include an actuator 124 (e.g., a linear actuator) or other mechanism for moving a frame 126 of the material feed assembly 104 relative to the anchor points 116. For example, the actuator 124 may move the frame 126 relative to the pivot plate 115 that is secured to the anchor points 116 via the pins 122.

Figure 3:
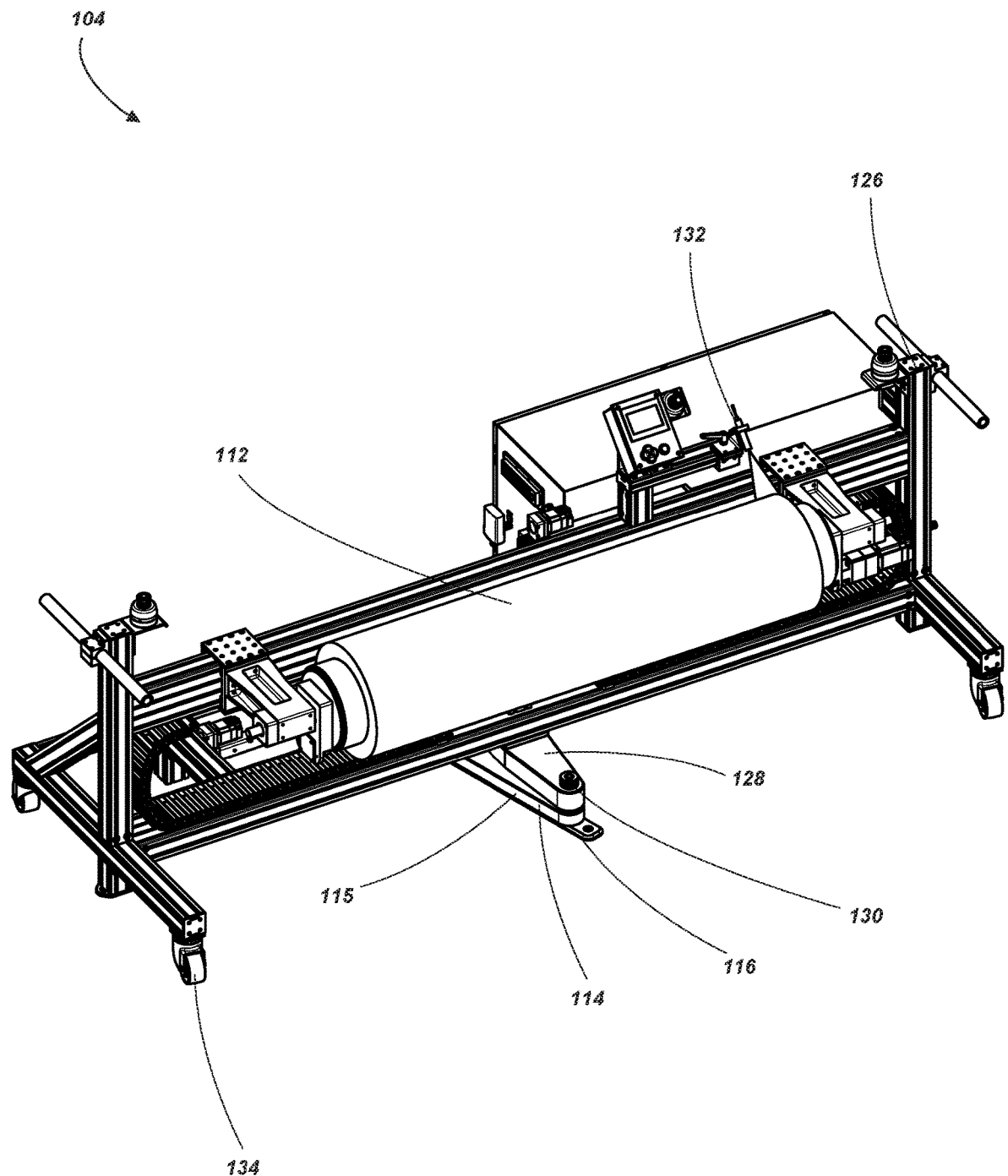
FIG. 3 is a front isometric view of the material feed assembly of FIG. 2.

FIG. 3 illustrates a front isometric view of the material feed assembly 104. Referring to FIGS. 2 and 3, a portion of the frame 126 (e.g., plate 128, which protrudes outward from the material 112, for example, along a length of the material 112) of the material feed assembly 104 may include a singular pivot point 130 attaching the frame 126 to the pivot plate 115. In some embodiments, such a singular pivot point 130 may be coupled to the pivot plate 115 to provide only rotational movement between the frame 126, which holds and positions the material 112, and the pivot plate 115.

In some embodiments, such a singular pivot point 130 may be positioned proximate (e.g., at) a central portion of the material feed assembly 104. For example, the singular pivot point 130 may be positioned at substantially a lateral and/or longitudinal center point of the material feed assembly 104 and/or the material 112.

In some embodiments, the material feed assembly 104 may include a sensor or marker 132 (e.g., an optical sensor, laser indicator) that monitors at least one side portion of the material 112. For example, sensor 132 may monitor a lateral side of the material 112 as it is moved (e.g., spooled) off a supply in order to ensure proper alignment of the material 112 and/or to monitor the diameter of the material 112.

In some embodiments, the frame 126 of the material feed assembly 104 may be movable in order to facilitate rotation and repositioning of the material feed assembly 104. For example, the material feed assembly 104 may include one or more rollers 134 coupled to the frame 126. The rollers 134, or other movable feature, may assist in positioning the material feed assembly 104 on multiple sides of the forming tool 102 (FIG. 1), where both positions of the assembly 104 enable pivoting relative to the tool 102. The rollers 134, or other movable feature, may enable the material feed assembly 104 to be rotated relative to the forming tool 102 via the pivot mechanism 114.

Referring again to FIG. 2, the material 112 may be movably mounted to the frame 126 to enable the material 112 to be positioned relative to the tool 102 (FIG. 1), for example, in a lateral direction (e.g., a direction transverse to the direction that the material is moved onto the tool 102 from the material feed assembly 104). For example, the material 112 may be mounted on a rail system 136 (e.g., via slidable arms 138). The arms 138 may be coupled to one or more actuators 140. For example, each arm 138 may be coupled to one respective actuator 140 (e.g., a linear actuator). The actuators 140 may be used to move the material 112 relative to the frame 126 (e.g., and to the pivot mechanism 114). The actuators 140 may be used to move one or more of the arms 138 to accommodate materials 112 have varying lateral dimensions. In some embodiments, one or more of the arms 138 may include a mechanism to control dispensing of the material 112 (e.g., a rotary motor for spooling and unspooling the material 112).

In some embodiments, the forming tool rotates at a selected speed while the material feed assembly 104 rotates the material at a lesser speed (e.g., or is held stationary) to apply tension to the material.

Figure 4:
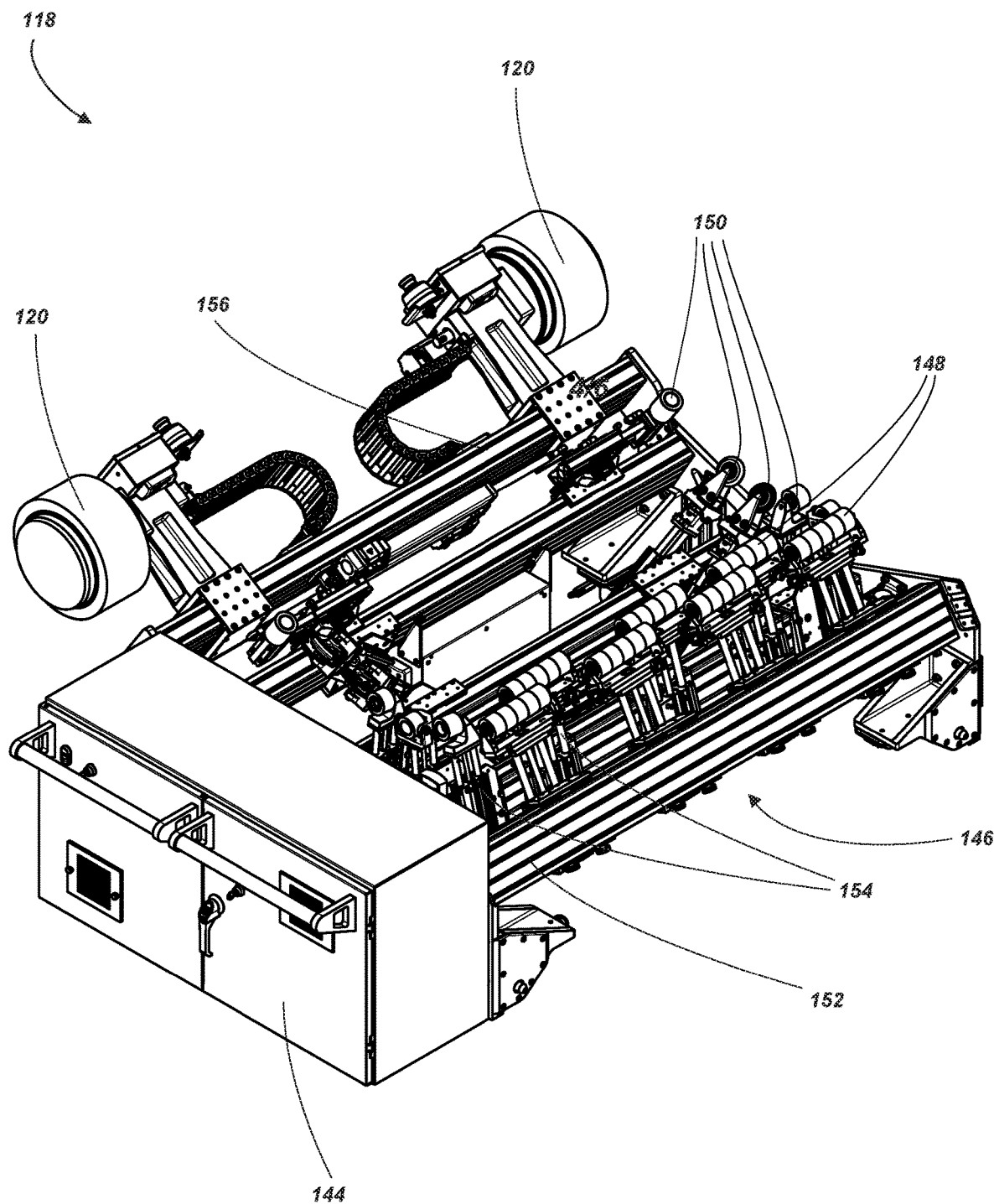
FIG. 4 is an isometric view of a forming mechanism according to an embodiment of the present disclosure.

FIG. 4 is an isometric view of a forming mechanism (e.g., the forming mechanism 118 of the system 100 shown in FIG. 1). In some embodiments, the forming mechanism 118 may include an onboard and/or integrated control assembly 144 that may include one or more of control systems, processors, motors, etc. that are in communication with and capable of controlling one or more of the features of the forming mechanism 118.

Referring to FIGS. 1 and 4, the forming mechanism 118 may be positioned underneath the forming tool 102 and may act to manipulate (e.g., force) the material 112 prior to, during, and/or after the material 112 is placed over the forming tool 102. The forming mechanism 118 may include one or more forming features or members 146 (e.g., aligned rollers 148, sequential rollers 150, squeegees, shoes, conformable elements, rotating members 120, combinations thereof, etc.), one or more of which may be controlled and/or in communication with the control assembly 144. For example, the forming mechanism 118 may include the aligned rollers 148 that are position substantially within a common plane or arc. Such aligned roller 148 may be configured to engage with a substantially uniform surface of the tool 102 and/or a surface with relatively minimal surface variations. The forming mechanism 118 may include the sequential rollers 150 that are each individually positioned to provide a sequential forcing of the material 112. For example, the sequential rollers 150 may gradually change in position angle in order to force the material 112 onto a non-uniform surface of the tool 102 (e.g., the flange portions 108).

Each of the forming members 146 may be movably mounted on the forming mechanism 118. For example, the forming members 146 may be laterally movable on rail 152 and/or may be movably mounted on one or more actuators 154 (e.g., which may move the forming members 146 radially, laterally, and/or combinations thereof toward, away from, and/or along the tool 102).

In some embodiments, the forming mechanism 118 may include the rotating members 120 that may be used to apply and/or form one or more sheets of material 112 on a side portion (e.g., lateral side portion of the tool 102). In some embodiments, the rotating members 120 may be movably mounted on the forming mechanism 118 (e.g., on rail 156) and may be moved (e.g., by an actuator) in order to position the rotating members 120 relative to the tool 102.

Figure 5:
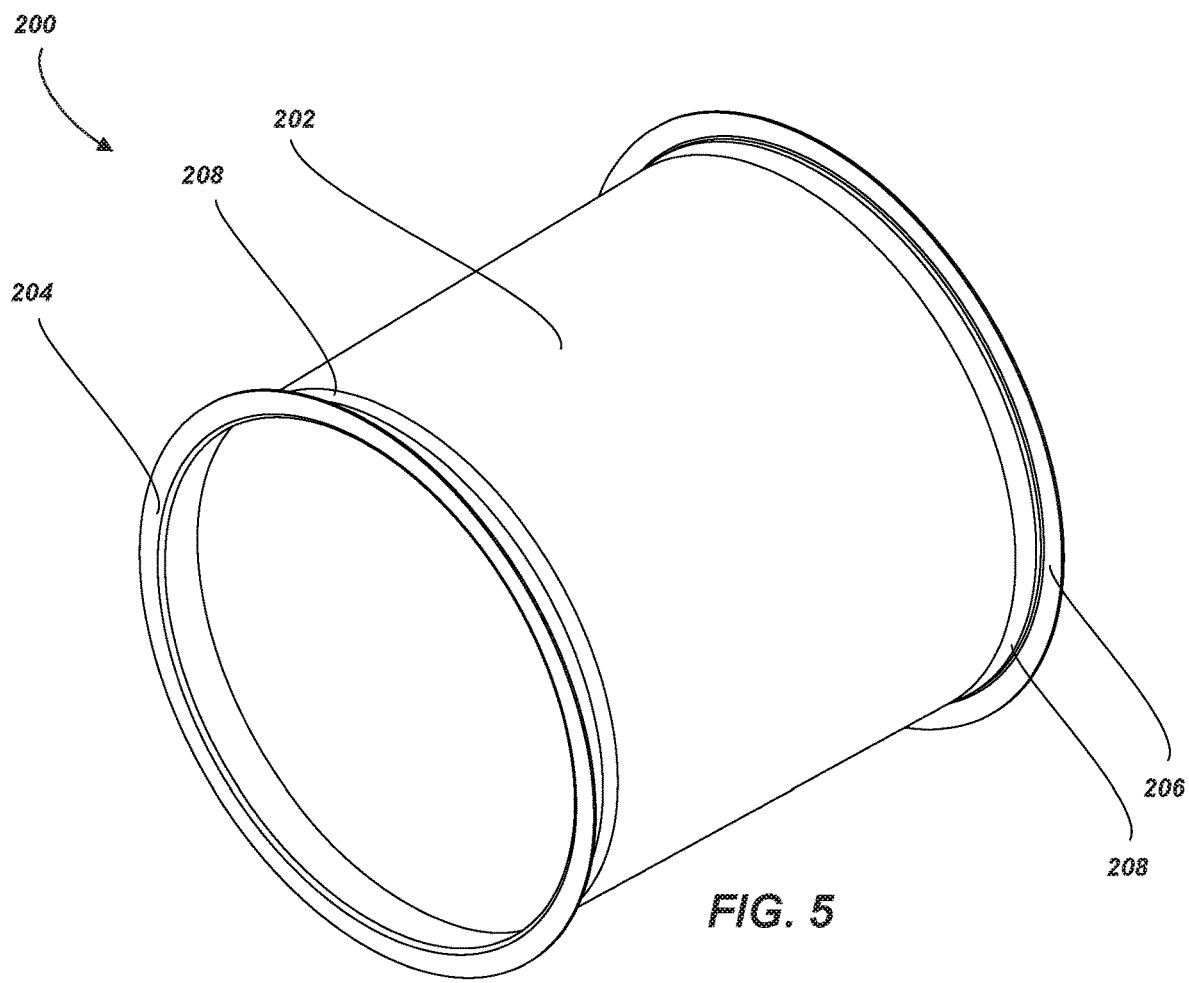
FIG. 5 is an isometric view of a structure according to an embodiment of the present disclosure.

FIG. 5 is an isometric view of a composite structure or part 200, which, in some embodiments, may be somewhat similar to the composite structure 106 shown and described with reference to FIG. 1. As shown in FIG. 5, composite structure or part 200, or portion thereof, may exhibit an at least partially annular shape, such as, for example, at least a portion of an annular structure (e.g., a full annular structure with one or more radially extending or upturned flanges on either end of a middle or body portion 202 of the structure 200). For example, the structure 200 includes may include one or more radially extending flange portions (e.g., first flange portion 204 and a second flange portion 206, positioned at opposing ends of the body portion 202). In some embodiments, the structure 200 may include one or more reinforcing materials 208, for example, positioned proximate to and/or extending onto the flange portions 204, 206.

As noted above, the structure 200 may exhibit an at least partially annular shape that varies along the structure 200. For example, the structure 200 may include an at least partially annular shape that varies along a dimension of the structure 200 (e.g., a length of the structure 200 between the opposing flange portions 204, 206). The dimensional variation in the structure 200 may exhibit a increase (e.g., gradual increase) in the diameter and/or radius of curvature of the body portion 202 to define a tapered portion between the opposing flange portions 204, 206 (e.g., a substantially frustoconical shape). In some embodiments, a portion (e.g., only a portion, an entirety) of the body portion 202 may include the tapered portion, which may extend along a length of the structure 200 in a continuous and/or discontinuous manner.

Figure 6:
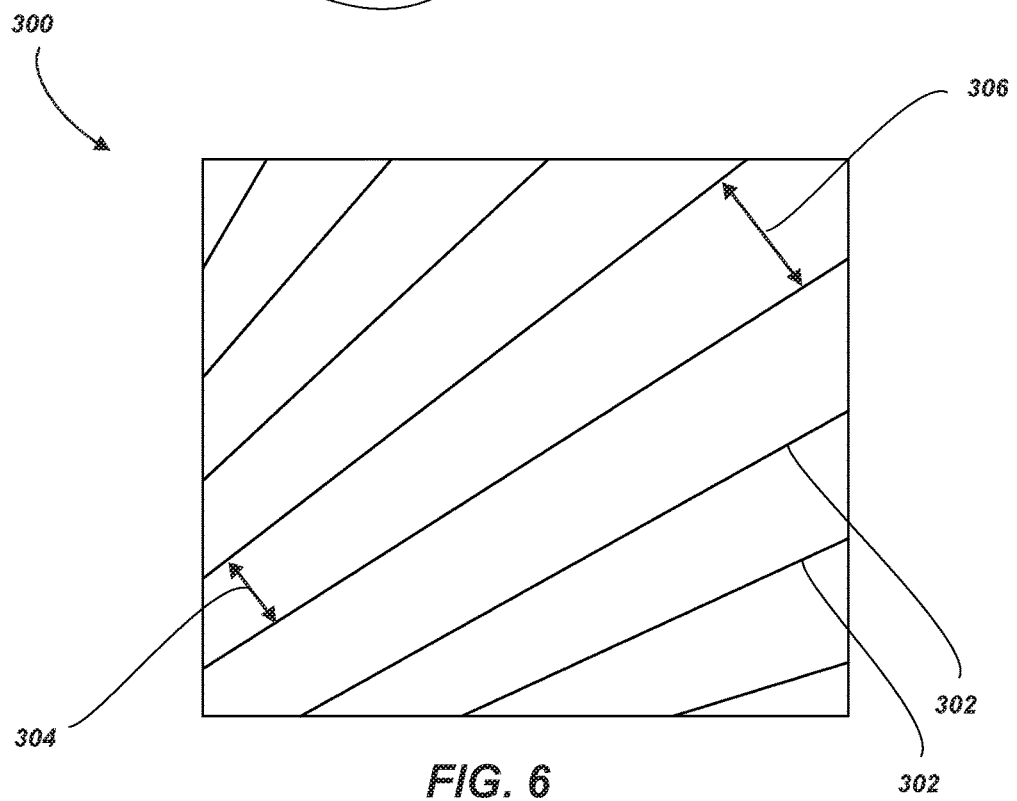
FIG. 6 is simplified view of a sheet of material that may define a portion of a composite structure according to an embodiment of the present disclosure.

FIG. 6 is simplified view of a sheet of material 300 that may define a portion of a composite structure (e.g., the composite structures 106, 200 shown and described with reference to FIGS. 1 and 5). Referring to FIGS. 5 and 6, the sheet of material 300 may include reinforcing fibers extending along the sheet of material 300. Application of the material 300 to the tool 102 (FIG. 1) according to some embodiments of the disclosure, may cause displacement of the fibers 302 in order to conform the material 300 to the tool 102 (e.g., without the need for cutting the material 300 or forming other discontinuities in the material). For example, spacing of adjacent fibers 302 of the material 300 may increase (e.g., gradually increase between spacing 304 and spacing 306) and/or may decrease (e.g., gradually decrease between spacing 306 and spacing 304) in order to compensate for changes and/or discontinuities in the shape of the structure 200. Such a configuration may involve stretching the material 300 transverse to the direction of the fibers 302. The material 300 extending between the adjacent fibers 302 in the spacing 304, 306 may be continuous (e.g., the material 300 extending between the fibers 302 without any substantially discontinuities and/or cutting) and uniform (e.g., exhibiting a substantially common dimension, such as, a thickness, without overlapping).

In some embodiments, the structure 200 may include one or more continuous plies of material 300 that extend from the at least partially tapered annual shape of the middle of the structure 200 onto (e.g., to a radial extent of) the flange portions 204, 206. In such an embodiment, the spacing between the fibers 302 may increase as the material 300 extends over a portion of the structure 200 having an increased or increasing dimension (e.g., the taper). The spacing between the fibers 302 may increase as the material 300 extends from the body portion 202 onto the flange portions 204, 206, and, optionally, to a radialmost extent of the flange portions 204, 206.

Figure 7:
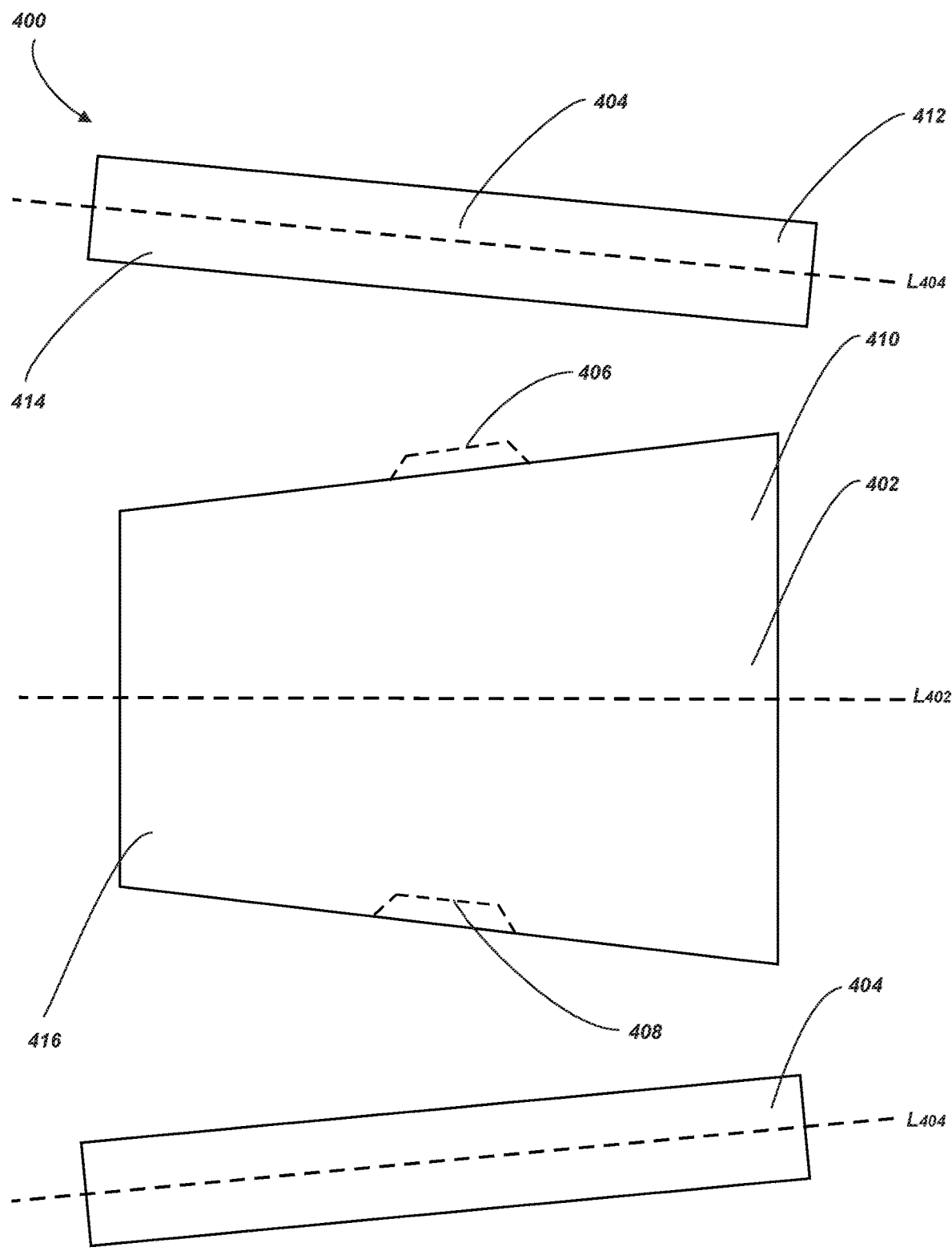
FIG. 7 is simplified view of a composite part forming system according to an embodiment of the present disclosure.

FIG. 7 is simplified view of a composite part forming system 400 including a forming tool 402 (e.g., that may be similar to the forming tool 102 discussed above with relation to FIG. 1) and one or more material feed assemblies 404 (e.g., that may be similar to the material feed assemblies 104 discussed above with relation to FIGS. 1 through 3). As shown in FIG. 7, a material feed assembly 404 may be positioned on one side of the forming tool 402. The material feed assembly 404 may be pivoted relative to the forming tool 402 such that the longitudinal axis $L_{404}$ of the material feed assembly 404 is offset with (e.g., non-parallel, transverse) the longitudinal axis $L_{402}$ of the forming tool 402. For example, the longitudinal axis $L_{404}$ of the material feed assembly 404 may define an acute angle (e.g., ±5, 10, 15, 20, 25, 30, 35, 40, 45 degrees, or more, or variations therebetween) with the longitudinal axis $L_{402}$ of the forming tool 402 (e.g., when the longitudinal axes $L_{402}$, $L_{404}$ are viewed in a lateral two-dimensional plane intersecting both the forming tool 402 and the material feed assembly 404).

In some embodiments, the material feed assembly 404 may be positioned on another (e.g., opposing side) of the forming tool 402. In some embodiments, two or more material feed assemblies 404 may be positioned on multiple sides of the forming tool 402.

In some embodiments, the forming tool 402 may include one or more other discontinuous features (e.g., bump outs 406, bump ins 408, protrusions, recesses, etc.).

In an example embodiment, a tapered structure (e.g., structures 106, 200) may be formed by applying a sheet of material from the material feed assembly 404 to the forming tool 402. The sheet of material (e.g., material 112, 300) may include fibers extending (e.g., continuously extending) through the sheet material. The fibers may have an offset angular orientation relative to a lateral side of the sheet of material. For example, the fibers may be set at, for example, 15, 30, ±45, 60, 75, 90 degrees, more or less, or variations therebetween. Further materials with fibers set at 0 degrees may also be interleaved with sheets of material having fibers at differing angles of orientation. In some embodiments, the fibers may comprise discontinuous fibers (e.g., broken fibers), at any angle, including 0 degrees.

An end portion of the sheet of material may be fed from the material feed assembly 404 and placed on (e.g., adhered to) the forming tool 402. In order to apply relatively more tension to a side portion of the material that is stretched over a relatively larger diameter side portion 410 of the forming tool 402 (e.g., having a relatively larger radius of curvature), the longitudinal axis $L_{404}$ of the material feed assembly 404 may be positioned at an acute angle (e.g., about ±15 degrees) to the longitudinal axis $L_{402}$ of the forming tool 402 while the material is being applied from the material feed assembly 404 onto the forming tool 402. For example, the longitudinal axis $L_{404}$ of the material feed assembly 404 may be positioned at an acute angle (e.g., about ±15 degrees) to the longitudinal axis $L_{402}$ of the forming tool 402, where a side portion 412 of the material feed assembly 404 is positioned proximate to (e.g., adjacent, on the same lateral side) the relatively larger diameter side portion 410 of the forming tool 402. Stated in another way, the material feed assembly 404 may be angled in a direction toward the relatively larger diameter side portion 410 of the forming tool 402.

As noted above, positioning the material feed assembly 404 (e.g., at an angle relative to the tool 402 and/or on multiple sides of the tool 402) may enable the material (e.g., the fibers in the material) to be oriented in a desired angle relative to the tool 402 in order to accommodate the varying features of the tool 402. For example, as discussed below, it may be desirable to orient the fibers in a direction toward a relatively smaller diameter of the tool 402 in order to achieve the desired stretching between the fibers during layup. The ability to position the material feed assembly 404 may enable the use of fibers at varying angles to be applied on both sides of the tool 402 to achieve the desired layering of fibers at differing angles, while still enabling the fibers to extend in a selected orientation (e.g., in the direction toward the relatively smaller diameter of the tool 402).

In some embodiments, at the start of the forming process, the longitudinal axis $L_{404}$ of the material feed assembly 404 may be initially positioned substantially parallel to the longitudinal axis $L_{402}$ of the forming tool 402. In some embodiments, at the start of the forming processes the longitudinal axis $L_{404}$ of the material feed assembly 404 may be initially positioned at an acute angle (e.g., about ±15 degrees) to the longitudinal axis $L_{402}$ of the forming tool 402, where another side portion 414 of the material feed assembly 404 is positioned proximate to (e.g., adjacent, on the same lateral side) a relatively smaller diameter side portion 416 (e.g., having a relatively smaller radius of curvature) of the forming tool 402 (e.g., the material feed assembly 404 may be angled in a direction toward the relatively smaller diameter side portion 416 of the forming tool 402). In either of such embodiments, the material feed assembly 404 may be moved (e.g., gradually pivoted) as the material is spooled onto the forming tool 402 and may eventually move (e.g., after about a quarter to a half of the material has been spooled onto the forming tool 402) to the position shown in FIG. 7, where the material feed assembly 404 may be angled in a direction toward the relatively larger diameter side portion 410 of the forming tool 402.

In some embodiments, the centrally mounted pivoting feature of the material feed assembly 404, as discussed above, may enable the material feed assembly 404 to gradual pivot in order to move the side portion 412 of the material feed assembly 404 relatively closer to a side of the forming tool 402 while moving the another side portion 414 of the material feed assembly 404 relatively further away from another side of the forming tool 402, or vice versa.

In some embodiments, the angle of the fibers (see, e.g., fibers 302 in FIG. 6) in the material is oriented such that the fibers extend (e.g., along the length of the material) in a direction toward the relatively smaller diameter side portion 416 of the forming tool 402. In other words, the fibers may extend from the side portion 412 of the material feed assembly 404, across the width of the material, and to or toward the relatively smaller diameter side portion 416 of the forming tool 402.

In some embodiments, positioning the material feed assembly 404 relative to the forming tool 402 may decrease the amount of necking on the material and/or decrease the amount of material slack experienced on the relatively smaller diameter side portion 416 of the forming tool 402. For example, it has been observed that decreasing the distance between the forming tool 402 to the material feed assembly 404 causes the material to become fiber locked on the relatively larger diameter side portion 410 of the forming tool 402 and loose on the relatively smaller diameter side portion 416 of the forming tool 402. It has been further observed that increasing the distance between the forming tool 402 and the material feed assembly 404 decreases the amount of the slack and/or the fiber lock, but increases necking or narrowing of the material width. Positioning the material feed assembly 404 relative to the forming tool 402 such that about 0% to 50% (e.g., 10% to 30%, 20%, depending on material fiber angle) of the contact width of the material not being supported by tension of fibers that extend from the material feed assembly 404 to the forming tool 402 results in relatively decreased necking with expected slack on the small diameter side portion.

In some embodiments, orienting the material feed assembly 404 at an angle to the forming tool 402 may further decrease the amount of necking on the material and/or decrease the amount of material slack experienced on the relatively smaller diameter side portion 416 of the forming tool 402. For example, at least a portion of the remaining slack on the relatively smaller diameter side portion 416 of the forming tool 402 at the start of a ply of material may then be decreased or removed by pivoting the material feed assembly 404. In some embodiments, gradually pivoting the material feed assembly 404 as the material is initially fed onto the forming tool 402 may decrease or remove slack in the material. After a select amount of material is spooled out, the material feed assembly 404 may remain nearly static at a fixed angle until a full rotation of the forming tool 402 is made. As discussed above, the pivot point may be centered under the material feed assembly 404. In some embodiments, the centered pivot point may enable the material feed assembly 404 to be substantially "self-governing" when pulling on a centered spool of material. As also discussed above, automation and controls on the material feed assembly 404 may act to at least partially pivot the material feed assembly 404 (e.g., under the control of a programmed control system). For example, the pivoting of material feed assembly 104 may be governed by an actuator, Where implemented, the gradual pivoting may enable the relatively larger diameter side portion 410 of the forming tool 402 to take up the material without causing unnecessary slack on the relatively larger diameter side portion 410 of the forming tool 402.

In some embodiments, the material may comprise a feedstock material that is cut and sliced together to achieve a desired fiber angle orientation having a desired length. Typically, a stock supply roll of fibers is provided by suppliers in a 0 degree orientation. However, the application of the 0 degree ply material, or even 90 degree ply material, to structures having variations in geometry may be difficult, or even impossible, and often requires darting or otherwise cutting the plies. In some embodiments, ply rolls of material are made from the stock rolls to a desired orientation that does not require darting. For example, flags of material may be pattern cut out of a supply roll to have a desired fiber orientation. The patterned cut flags having the desired fiber orientation are then spliced together on a backing material. Such flags may be lined up with the ends overlapping, butt-spliced, or spaced apart.

In some embodiments, the material may be selected to substantially match a dimension of the forming tool 402 (e.g., an entire dimension of the forming tool 402 along the longitudinal axis $L_{402}$ of the forming tool 402 including, for example, the flange portions). In such an embodiment, the material may be continuous from flange edge to flange edge of the forming tool 402.

After a desired amount of material has been applied to the tool 402, the resultant structure may be further processed by conventional processing techniques (e.g., bagging and curing processes). For example, the structure may be cured in a heating process (e.g., an autoclave process, a kiln process, an infiltration process, etc.) under select heat and/or pressure. Once the part has been cured, the formed composite structure may be removed from the tool 402.

In some embodiments, composite structures are created by ply layers formed on a tool one ply at a time. In some embodiments, ply layers of material having alternating fiber orientations are used to form the composite structure.

Embodiments of the present disclosure may provide methods and systems to manufacture structures (e.g., at least partially annular structures) having at least one varying dimension out of fiber-reinforced composites. The at least partially automated process and related apparatuses may enable the forming of continuous or discontinuous material into such stiffened at least partially annular structures including partial plies in local locations. In some embodiments, the disclosure may enable a continuous wrapping process of the material to lay up a full circumferential ply with roller compaction and forming on a ply by ply basis or a multiple ply process, where the number of multiple plies is less than the total number of plies in the resultant structure.

Embodiments of the present disclosure enable automated manufacturing of a part that has been typically made with hand layup. It also enables the manufacture of such structures with relatively wide format pre-preg tape (e.g., having a width equal to or greater than an axial length of the structure). Utilizing hand layup, these structures must be fabricated with woven material, which has lower mechanical performance and is more expensive. Embodiments of the present disclosure enable an at least partially automated manufacture and production of a part with enhanced specific strength characteristics at a relatively lower cost than a hand lay-up without the need for intermediate debulking of the structure.

Embodiments of the present disclosure provide the ability to form a composite structure in an at least partially automated process, where such a structure is a body of revolution or partial body of revolution, with varying cross section. Examples of such structures include structures with a conical surface or frustum with flanges or a geometric barrel with flanges. The structure may have other geometric discontinuities and/or distortions, such as an oblique frustum with flange or local pad up or ramp. Such processes and apparatuses enable layup of a part with a continuous sheet of composite material that is stretched and deformed to part geometry. This allows for the fabrication of parts that could previously only be fabricated by hand layup or in some cases fiber placement. Because the process is automated, it can be more cost effective than hand layup. When this process is used instead of fiber placement it is faster and utilized lower cost pre-preg tape or fabric rather than more expensive slit tape.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A method of forming a composite structure having an at least partially annular shape in an at least partially automated process, the method comprising:
   supplying at least one ply of material from a material feed assembly to a tool, the at least one ply of material comprising a planar sheet of material containing fibers in at least some matrix material;
   orienting a longitudinal axis of the material feed assembly at an oblique angle relative to a longitudinal axis of the tool to produce a varying tension in the at least one ply of material along a lateral direction of the at least one ply of material where the at least one ply of material is stretched over the tool, the tool defining the at least partially annular shape around the longitudinal axis of the tool;
   applying the at least one ply of material on a forming surface of the tool configured to form the composite structure having the at least partially annular shape, wherein the fibers in the at least one ply of material are offset relative to a side of the at least one ply of material;
   conforming the at least one ply of material to the forming surface of the tool, comprising:
      conforming a first portion of the at least one ply of material to a first radius of curvature to the forming surface of the tool;
      conforming a middle portion of the at least one ply of material extending between the first portion and a second portion of the at least one ply of material to the forming surface of the tool; and
      conforming the second portion of the at least one ply of material to a second radius of curvature to the forming surface of the tool, wherein the second radius of curvature is either greater than or lesser than the first radius of curvature; and
   curing the at least one ply of material to form the composite structure.

2. The method of claim 1, wherein conforming the middle portion of the at least one ply of material comprises extending the middle portion along a portion of the forming surface of the tool that gradually changes from the first radius of curvature to the second radius of curvature.

3. The method of claim 1, wherein orienting the longitudinal axis of the material feed assembly at the oblique angle relative to the longitudinal axis of the tool comprises orienting a longitudinal axis of a spool of material on the material feed assembly at the oblique angle relative to a centerline of the tool.

4. The method of claim 1, further comprising positioning a supply of the at least one ply of material on the material feed assembly on one side of the material feed assembly relatively closer to the tool as compared to another opposing side of the supply of the at least one ply of material on the material feed assembly.

5. The method of claim 1, further comprising forming the composite structure to have an annular shape with a first open end of the annular shape and a second open end of the annular shape.

6. The method of claim 5, further comprising:
defining the first open end to have a first diameter comprising the first radius of curvature; and
defining the second open end to have a second diameter comprising the second radius of curvature.

7. The method of claim 6, further comprising forming the middle portion to gradually variate from the first diameter to the second diameter.

8. A method of forming a composite structure having an at least partially annular shape in an at least partially automated process, the method comprising:
supplying at least one ply of material from a material feed assembly to a tool;
as the at least one ply of material is supplied from the material feed assembly to the tool, applying a force to at least a portion of the at least one ply of material comprising:
orienting a longitudinal axis of the material feed assembly at an oblique angle relative to a longitudinal axis of the tool to produce a varying tension in the at least a portion of the at least one ply of material, the varying tension extending from the material feed assembly to the tool;
conforming a first portion of at least one ply of material to a first diameter to a forming surface of the tool;
conforming a second portion of the at least one ply of material to a second diameter to the forming surface of the tool, wherein the second diameter is either greater than or lesser than the first diameter;
extending a middle portion of the at least one ply of material extending between the first portion and the second portion of the at least one ply of material along a portion of the forming surface that gradually changes from the first diameter to the second diameter; and
manipulating the at least one ply of material with a forming mechanism after the at least one ply of material is applied to the tool in order to conform the at least one ply of material to a non-uniform portion of the forming surface of the tool.

9. The method of claim 8, wherein applying the force to the at least a portion of the at least one ply of material further comprises applying the tension to only a portion of the at least one ply of material between the material feed assembly to the tool.

10. The method of claim 8, wherein applying the force to the at least a portion of the at least one ply of material further comprises applying relatively more of the tension to a side portion of the at least one ply of material that is stretched over the first diameter than another side portion of the at least one ply of material that is placed over the second diameter.

11. The method of claim 8, wherein applying the force comprises stretching the at least one ply of material in a direction transverse to a direction of fibers in the at least one ply of material.

12. The method of claim 11, further comprising pivoting the material feed assembly relative to the tool.

13. The method of claim 12, further comprising orienting a lateral axis of the material feed assembly at an oblique angle relative to the longitudinal axis of the tool.

14. The method of claim 12, further comprising supplying the at least one ply of material from a spool of material rotatably coupled to the material feed assembly.

15. The method of claim 12, further comprising pivoting the material feed assembly relative to the tool to position one side of a spool of material relatively closer to the tool and to position another opposing side of the spool of material relatively further away from the tool.

16. The method of claim 12, further comprising automatically pivoting the material feed assembly relative and a spool of material relative to the tool during the formation of the composite structure on the tool.

17. A method of forming a composite structure having an annular shape in an at least partially automated process, the method comprising:
supplying at least one ply of material from a material feed assembly to a tool;
conforming a first portion of at least one ply of material to a first diameter to a forming surface of the tool;
conforming a second portion of the at least one ply of material to a second diameter to the forming surface of the tool, wherein the second diameter is or lesser than the first diameter;
as the at least one ply of material is supplied from the material feed assembly to the tool, applying relatively more tension to the first portion of the at least one ply of material that is stretched over the first diameter than the second portion of the at least one ply of material that is stretched over the second diameter by orienting a longitudinal axis of the material feed assembly at an oblique angle relative to a longitudinal axis of the tool, the tension applied to the first portion of the at least one ply of material extending from the material feed assembly to the tool; and
manipulating the at least one ply of material with a forming mechanism after the at least one ply of material is applied to the tool in order to conform the at least one ply of material to a non-uniform portion of the forming surface of the tool.

18. The method of claim 17, further comprising stretching the at least one ply of material in a direction transverse to a direction of fibers in the at least one ply of material.

* * * * *